United States Patent [19]
Nomura et al.
[11] Patent Number: 5,062,981
[45] Date of Patent: Nov. 5, 1991

[54] MAGNET AND METHOD FOR MANUFACTURING THE SAME

[75] Inventors: Takuji Nomura; Shogo Miki; Takashi Sakauchi; Yoshitaka Sato; Yuusuke Honma, all of Ohtsu, Japan

[73] Assignee: Kanegafuchi Kagaku Kogyo Kabushiki Kaisha, Osaka, Japan

[21] Appl. No.: 541,672

[22] Filed: Jun. 21, 1990

[30] Foreign Application Priority Data

Jun. 27, 1989 [JP] Japan ........ 1-164352
Feb. 2, 1990 [JP] Japan ........ 2-24695

[51] Int. Cl.$^5$ ........ H01F 1/053; C09K 15/02
[52] U.S. Cl. ........ 252/62.54; 428/900; 524/785; 264/DIG. 58
[58] Field of Search ........ 252/62.54; 428/407, 428/400; 524/785

[56] References Cited

U.S. PATENT DOCUMENTS 4,715,977 12/1987 Salensky ........ 252/62.54
4,732,887 3/1988 Obanawa ........ 502/402
4,808,326 2/1989 Tanino ........ 252/62.54
4,851,497 7/1989 Wakui ........ 528/176

FOREIGN PATENT DOCUMENTS 0125752 11/1984 European Pat. Off. .
0289979 11/1988 European Pat. Off. .
3803538 8/1988 Fed. Rep. of Germany .
2079404 3/1990 Japan .

*Primary Examiner*—Prince E. Willis
*Assistant Examiner*—Thomas Steinberg
*Attorney, Agent, or Firm*—Armstrong, Nikaido, Marmelstein, Kubovcik & Murray

[57] ABSTRACT

Disclosed is a magnet which is composed mainly of magnetic powders expressed by R-T-B (R is Nd or that partially replaced with rare earth elements and T is Fe or that partially replaced with transition metal.) and a chelate resin or a chelate resin in admixture with other synthetic resins. The magnetic has markedly improved resistance to deterioration caused by oxidation and corrosion.

8 Claims, No Drawings

MAGNET AND METHOD FOR MANUFACTURING THE SAME

BACKGROUND OF THE INVENTION

1. Field of the Invention:

The present invention relates to a resin bonded type magnet and its manufacture, more particularly, relates to a magnet prevented from deterioration caused by oxidation and by corrosion during use and its manufacturing method.

2. Description of Prior Art:

An alloy magnet (hereinafter called a rare earth magnet) comprising a rare earth metal and a transition metal as the main ingredient is possessed of excellent magnetic properties compared with a conventional ferrite type or an Alnico type magnet, and therefore, it has been recently utilized in various fields. However, it can be easily oxidized, and the defects are remarkably observed in a Nd-Fe-B type magnet, in particular. A magnet comprising such rare earth magnetic powder bonded with a synthetic resin binder gives rise to elapsing deterioration of magnetic properties due to oxidation and corrosion under humid atmosphere in service environment.

In order to overcome these problems, a method to coat the above magnet with an acrylic resin or an epoxy resin is proposed in Japanese Non-examined Publication No. 63-244711 and No. 63-244710. However, though some effects against deterioration due to oxidation and corrosion are recognizable using the above method, practical satisfaction is not fully obtained. In other words, the above conventional technology cannot provide practically satisfactory corrosion resistance to such a magnet owing to the following reasons;

(1) Though a resin layer suppresses to some extent the arrival of oxidizable and corrosive substances such as oxygen to the magnetic surfaces, there are no suppression effects against growth of oxidized and corroded products.

(2) Satisfactory adhesion between a magnet and a resin cannot be obtained.

SUMMARY OF THE INVENTION

It is an object of the present invention to provide a resin bonded type magnet which is improved in deterioration caused by oxidation and corrosion.

It is another object of the present invention to provide a method for manufacturing a resin bonded type magnet which has improved resistance to deterioration caused by oxidation and corrosion.

Other objects and advantages of the present invention will become apparent from the following detailed description.

The present inventors have made an extensive series of studies, and found out that the above objects can be solved by making a magnet mainly composed of a rare earth magnetic powder and a chelate resin or a chelate resin mixed up with other synthetic resins, and completed the present invention.

DETAILED DESCRIPTION OF THE INVENTION

The present invention encompasses;

in a first aspect, a magnet which is composed mainly of magnetic powders expressed by R-T-B (R is Nd or that partially replaced with rare earth elements and T is Fe or that partially replaced with transition metals.) and a chelate resin or a chelate resin in admixture with other synthetic resin, in a second aspect, a magnet manufacturing method wherein the magnet is molded using synthetic resin as a binder after coating with a chelate resin or a chelate resin together with other synthetic resins the surface of magnetic powders expressed by R-T-B (R is Nd or that partially replaced with rare earth elements and T is Fe or that partially replaced with transition metals.), in a third aspect, a magnet manufacturing method wherein the magnet is molded using as a binder a chelate resin or a chelate resin together with other synthetic resins to bond magnetic powders expressed by R-T-B (R is Nd or that partially replaced with rare earth elements and T is Fe or that partially replaced with transition metals.), in a fourth aspect, a magnet manufacturing method wherein after molding a molded product with a synthetic resin as a binder and magnetic powders expressed by R-T-B (R is Nd or that partially replaced with rare earth elements and T is Fe or that partially replaced with transition metals.), the surface of the molded product is coated with a chelate resin or a chelate resin together with other synthetic resins.

A method for coating magnetic powders with a chelate resin or a chelate resin together with other synthetic resins can provide the whole magnet including inside of the magnet with oxidation resistance and corrosion resistance, and a method for using as a binder a chelate resin or a chelate resin together with other synthetic resins can provide oxidation resistance and corrosion resistance at a low price without incorporating new processes. Besides, in cases where a coating film is prepared on the surface of the molded product, compensation effects arise even if defects happen on the coating film.

On the other hand, preparing on the surface of the molded product a layer of a chelate resin or a chelate resin together with other synthetic resins can provide higher oxidation resistance and corrosion resistance at a low price. In addition, when a coating film is prepared even on magnetic powders, compensation effects can be expected even if defects occur on the film of the surface of the molded product during molding processes, etc. Accordingly, by utilizing one or combining two or more of (a) preparing on magnetic powders coating films of a chelate resin or a chelate resin together with other synthetic resins, (b) using as a binder a chelate resin or a chelate resin together with other synthetic resins and (c) applying to a molded product a coating film of a chelate resin or a chelate resin together with other synthetic resins, further improvement in oxidation resistance and corrosion resistance can be achieved.

Magnetic powders used in the present invention includes particles of alloys expressed by R-T-B (R is Nd or that partially replaced with rare earth elements and T is Fe or that partially replaced with transition metals.) and unremovable impurities and it is preferable for most of its particle size to fall within 1–500 μm. If it is less than 1 μm, the powders are ignitable and are apt to deteriorate in magnetic properties due to oxidation, and if it is more than 500 μm, the powders lower in filling up ratio to cause difficulty in obtaining sufficient magnetic properties.

Chelate resins used in the present invention have coordinate groups which form chelate bonds with structural metallic ions of the magnetic powders within TABLE 1-continued

| Magnet sample | Resin film on the surface of magnetic powder particles | Resin binder | Resin film on the molded product surface |
|---|---|---|---|
| Example 2 | chelate | chelate | none |
| Example 3 | chelate | phenol | chelate |
| Example 4 | chelate | chelate | chelate |
| Example 5 | none | chelate | none |
| Example 6 | none | chelate | chelate |
| Example 7 | none | phenol | chelate |

In Table 1, "none" means no film formation, and "chelate", "phenol" and "acryl" mean that a chelate resin from condensation between carboxyl groups of tannic acid and a phenol resin, a resol type phenol resin or an acrylic resin were used respectively in this example. Nd-Fe-B type magnetic powders (manufactured by General Motors) were used.

METHOD TO FORM A RESIN FILM ON THE SURFACE OF MAGNETIC POWDERS

Magnetic powders were immersed in a 10% by weight MEK solution of resin, dried to touch and heated at 150° C. for 15 min.

METHOD TO BLEND AND MOLD MAGNETIC POWDERS AND A RESIN BINDER

80% by volume of magnetic powders and 20% by volume of a resin were blended, kneaded and molded at a normal temperature under pressure of 5 ton/cm$^2$. Thereafter, the resin binder was made to harden at 150° C. for 15 min for a chelate resin case and at 190° C. for 2 hr for a phenol resin case to obtain a ring-shaped molded product with 8 mm in outside diameter, 6 mm in inside diameter and 4 mm in height.

METHOD TO FORM A RESIN FILM ON THE PRODUCT SURFACE AFTER MOLDING

The molded product obtained by the above method was immersed in a 15.0% by weight MEK solution of resin and dried to touch. Thereafter, a coating resin was made to harden at 150° C. for 15 min for a chelate resin case and at 100° C. for 1 hr plus 190° C. for 1 hr for a acryl resin case.

EVALUATION TEST

Rust preventive performance of the magnet samples in Comparison examples 1-2 and Examples 1-7 obtained by the above methods, were evaluated as follows: the magnet samples were stationarily placed in a hot humidity vessel with 95% RH atmosphere at 60° C., and the exterior appearance was observed every 100 hr. The observation was made using a 30 magnification optical microscope. Evaluation results are shown in Table 2.

TABLE 2

| Magnet samples | Environmental test results (hr) 100 | 200 | 300 | 400 | 600 | 800 |
|---|---|---|---|---|---|---|
| Comp. example 1 | C | D | E | E | E | E |
| Comp. example 2 | A | B | C | D | E | E |
| Example 1 | A | A | B | B | C | D |
| Example 2 | A | A | A | B | C | D |
| Example 3 | A | A | A | A | A | B |
| Example 4 | A | A | A | A | A | A |
| Example 5 | A | A | B | C | D | E |
| Example 6 | A | A | A | A | B | C |

TABLE 2-continued

| Magnet samples | Environmental test results (hr) 100 | 200 | 300 | 400 | 600 | 800 |
|---|---|---|---|---|---|---|
| Example 7 | A | A | A | A | C | D |

A: no rust
B: spotted rust
C: medium rust
D: remarkable rust
E: extremely remarkable rust A mechanism to provide remarkable effects as shown in Table 2 due to usage of a chelate resin layer of the present invention is not made clear, but it is supposed as below;

Firstly, it is considered that the magnetic powders used in the present invention are oxidized in the neighborhood of their polar surface. The resulting oxidized products are caused to react with the chelete resin to produce insoluble complex salts and they supposedly adhere to the surface of the magnetic powders strongly to thus impart the oxidation resistance and the corrosion resistance to the magnet. Moreover, for the same reasons, the growth of oxidized and corroded products can be presumably suppressed.

Secondly, the chelete resin containing polyvalent phenol groups has a reducing property inherent in the polyvalent phenol groups, with which the oxidation resistance and the corrosion resistance can be presumably provided.

Thirdly, the chelate resin prevents oxidizable and corrosive substances from reaching the surface of the magnetic powders to thereby suppress oxidation and corrosion of the magnetic powders.

As mentioned above, according to the present invention, a magnet excellent in oxidation resistance and corrosion resistance can be provided.

What is claimed is:

1. A magnet comprising a magnetic powder expressed by R-T-B, wherein R is Nd or that partially replaced with rare earth elements and T is Fe or that partially replaced with transition metals, and a chelate resin or a chelate resin in admixture with other synthetic resins.

2. A magnet as claimed in claim 1, wherein the chelate resin contains groups expressed by formula (I):

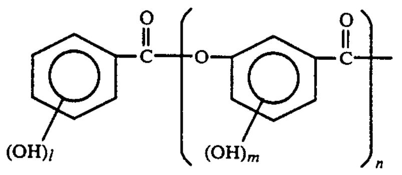

(I)

wherein l=integers of 1-5, m=integers of 1-4, and n=integers of 1 or more.

3. A method for manufacturing a magnet wherein the magnet is molded using a synthetic resin binder after coating with a chelate resin or a chelate resin together with other synthetic resins the surface of magnetic powders expressed by R-T-B wherein R is Nd or that partially replaced with rare earth elements and T is Fe or that partially replaced with transition metals.

4. A method as claimed in claim 3, wherein the synthetic resin binder is a chelate resin or a chelate resin together with other synthetic resin.

5. A method for manufacturing a magnet wherein the magnet is molded using as a binder a chelate resin or a chelate resin together with other synthetic resins to bond magnetic powders expressed by R-T-B wherein R is Nd or that partially replaced with rare earth elements and T is Fe or that partially replaced with transition metals.

6. A method as claimed in claim 3, 4 or 5, wherein a molded product is coated with a chelate resin or a chelate resin together with other synthetic resins after molding.

7. A method for manufacturing a magnet wherein after molding a molded product with synthetic resin as a binder and magnetic powders expressed by R-T-B wherein R is Nd or that partially replaced with rare earth elements and T is Fe or that partially replaced with transition metals, the surface of the molded product is coated with a chelate resin or a chelate resin together with other synthetic resins.

8. A method as claimed in claim 3, 4, or 5, wherein the chelate resin is expressed by formula (I):

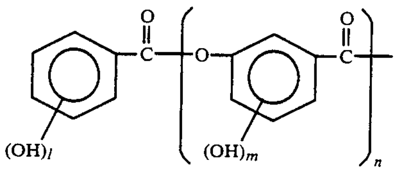

(I)

wherein l=integers of 1-5, m=integers of 1-4, and n=integers of 1 or more.

* * * * *

UNITED STATES PATENT AND TRADEMARK OFFICE

CERTIFICATE OF CORRECTION

PATENT NO. : 5,062,981

DATED : Nov. 5, 1991

INVENTOR(S) : Takuji Nomura, et al

It is certified that error appears in the above-indentified patent and that said Letters Patent is hereby corrected as shown below:

Columns 3 and 4 should be added as shown on the attached page.

Signed and Sealed this

Tenth Day of August, 1993

Attest:

Michael K. Kirk

MICHAEL K. KIRK

Attesting Officer

*Acting Commissioner of Patents and Trademarks*

UNITED STATES PATENT AND TRADEMARK OFFICE

CERTIFICATE OF CORRECTION

PATENT NO. : 5,062,981

DATED : Nov. 5, 1991

INVENTOR(S) : Takuji Nomura, et al

It is certified that error appears in the above-indentified patent and that said Letters Patent is hereby corrected as shown below:

Columns 3 and 4 should be added as shown on the attached page.

This Certificate supercedes Certificate of Correction issued August 10, 1983.

Signed and Sealed this

Nineteenth Day of October, 1993

Attest:

BRUCE LEHMAN

*Attesting Officer*

*Commissioner of Patents and Trademarks* a principal chain and/or its side chains. Various known high molecular compounds can be optionally selected and used for frameworks of principal chains of the resins. Examples of such high molecular compounds include linear high molecular compounds such as vinyl polymers, polyalkylene phthalate, polyether, polyamide and the like, setting resin such as phenol resin, epoxy resin, urethane resin, melamine resin, urea resin, unsaturated polyester resin and the like or denatured products, and natural high molecular compounds such as dextrin and the like.

As the coordinate groups forming chelate bonds with metallic ions, there are exemplified: —OH, —COOH, >C=O, —O—, —COOR, —$CONH_2$, —NO, $NO_2$, —$SO_3H$, —PHO(OH), —$PO(OH)_2$, —$NH_2$, >NH, >N—, —N=N—, >C=N—, —$CONH_2$, >C=N—OH, >C=NH, —SH, —S—, >C=S, —COSH, >P— and other functional groups. Compounds with these arranged closely to form chelate compounds are introduced into principal chains and/or side chains of the above framework resin. Groups such as polyvalent phenol, monoiminophenol, dion, amino dicarboxylic acid, etc. are exemplified. Among these, one having polyvalent phenol groups is preferable because of industrial availability. As a preferable example of a group with a polyvalent phenol group, the following expressed by a general formula (I) is exemplified;

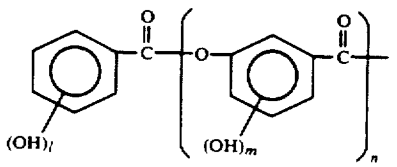

(I)

(l=integers of 1-5, m=integers of 1-4, n=integers of 1 or more) and a resin achieving the object of the present invention is made by condensation between a remaining terminal carboxylic acid group and a resin with a hydroxyl group such as phenol resin and dextrin, or between a hydroxyl group within an aromatic ring and a resin with carboxylic acid group such as a polymer containing acrylic acid.

As another example of the chelate resin, the following expressed by a general formula (II), which is obtained by dehydration between one with an amino methyl side chain introduced by reducing with $LiAlH_4$ a copolymer containing acrylonitrile and salicylaldehyde;

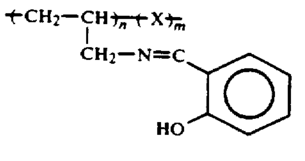

(II)

(X=other vinyl monomer unit, n and m=integers)

As methods to form on the surface of a molded product used in the present invention a film of a chelate resin or a chelate resin together with other synthetic resins, there are a spray method, an immersion method, etc.

As methods to form on the surface of magnetic powder particles used in the present invention a film of a chelate resin or a chelate resin together with other synthetic resins and as methods to mix the magnetic powders with a chelate resin or a chlete resin together with other synthetic resins as a binder, there are a spray method, an immersion method, a kneading method, etc.

In the present invention, as the manners to use a chelate resin and other synthetic resins, there are included: (1) mixing the both for application to coating on magnetic powders or a molded product or a binder, (2) coating with other synthetic resins after a chelate resin is applied onto magnetic powders or a molded product (overcoating=two-layer coating). In the case of (1), it is preferable for the chelate resin to be 10% by volume or more to the other synthetic resin. If it is less than 10% by volume, oxidation resistance and corrosion resistance cannot be fully obtained. On the other hand, in the case of (2), it is preferable to set the film thickness of a chelate resin to be 0.1-100 μm. If the film thickness is below 0.1 μm, oxidation resistance and corrosion resistance cannot be fully obtained, and if it is above 100 μm, the distance from the surface of a magnet becomes large to result in decrease in magnetic power effectively utilized and as a result, magnetic properties cannot be fully obtained.

In addition, in regard to the total quantity of the resin to the magnetic powders, that is, a chelate resin or a chelate resin together, with other synthetic resins applied to the surface of the magnetic powders or used as a binder, 5% by volume or more is better to 100% by volume of magnetic powders. If the total quantity of resin is under 5% by volume, it is difficult to fully obtain oxidation resistance and corrosion resistance as well as strength of a molded product.

Using compounds with the above chelate forming ability mixed up with other resin excellent in film forming, adhesion strength and physical strength, is also within the scope of the present invention.

As methods to mold a blend comprising magnetic powders and a resin binder used in the present invention, there are exemplified compression molding, injection molding, extrusion, calendering, etc.

Synthetic resin used in the present invention is optionally selected from widely-used thermoplastic resins, thermosetting resins and rubbers taking into consideration of a molding method and a film forming method. As thermosetting resins, phenol resin, epoxy resin, melamine resin, etc. can be exemplified, and as thermoplastic resins, polyamide such as nylon 6 and nylon 12, polyolefine such as polyethylene and polypropylene, polyvinyl chloride, polyester and polyphenylene sulfide can be exemplified. Additives generally used such as plasticizers, smoothing agents, thermostabilizers, flame retardants, modifiers, etc. can be also added.

In the following, the present invention is further explained in more detail by way of examples and comparison examples that follow, but the present invention should not be limited thereby.

COMPARISON EXAMPLES 1 AND 2, EXAMPLES 1-7

Magnet samples of two comparison examples and seven examples were made according to conditions listed in Table 1.

TABLE 1

| Magnet sample | Resin film on the surface of magnetic powder particles | Resin binder | Resin film on the molded product surface |
|---|---|---|---|
| Comp. example 1 | none | phenol | none |
| Comp. example 2 | none | phenol | acryl |
| Example 1 | chelate | phenol | none |